United States Patent
Sowins et al.

(10) Patent No.: US 12,157,144 B2
(45) Date of Patent: Dec. 3, 2024

(54) HIGH-PERFORMANCE TEXTURED COATING

(71) Applicant: SWIMC LLC, Cleveland, OH (US)

(72) Inventors: Jonathan Sowins, Minneapolis, MN (US); Jeffrey D. Rogozinski, Blaine, MN (US); John M. Bronk, Pine Island, MN (US); Keith M. Kirkwood, Apple Valley, MN (US); Robert G. Polance, Shoreview, MN (US)

(73) Assignee: SWIMC LLC, Cleveland, OH (US)

( * ) Notice: Subject to any disclaimer, the term of this patent is extended or adjusted under 35 U.S.C. 154(b) by 1 day.

(21) Appl. No.: 17/485,919

(22) Filed: Sep. 27, 2021

(65) Prior Publication Data

US 2022/0008953 A1  Jan. 13, 2022

Related U.S. Application Data

(63) Continuation of application No. 15/789,608, filed on Oct. 20, 2017, now abandoned, which is a
(Continued)

(51) Int. Cl.
*B05D 5/02* (2006.01)
*B05D 3/00* (2006.01)
(Continued)

(52) U.S. Cl.
CPC .............. *B05D 5/02* (2013.01); *B05D 3/007* (2013.01); *B05D 7/14* (2013.01); *B29B 7/002* (2013.01); *C09D 5/032* (2013.01); *C09D 5/033* (2013.01); *C09D 5/08* (2013.01); *C09D 5/28* (2013.01); *C09D 7/69* (2018.01); *C09D 163/00* (2013.01); *E04C 2/06* (2013.01); *E04C 5/015* (2013.01); *E04C 5/06* (2013.01); *E04C 5/07* (2013.01);
(Continued)

(58) Field of Classification Search
CPC . B05D 5/02; C09D 5/03; C09D 5/031; C09D 5/032; C09D 5/033; E04C 5/06; E04C 5/07; E04C 5/073
See application file for complete search history.

(56) References Cited

U.S. PATENT DOCUMENTS

| | | | |
|---|---|---|---|
| 4,929,294 A | 5/1990 | Blome | |
| 6,518,349 B1 | 2/2003 | Felix et al. | |

(Continued)

FOREIGN PATENT DOCUMENTS

| | | |
|---|---|---|
| CL | 199800353 | 2/1998 |
| CL | 201601324 | 5/2016 |

(Continued)

OTHER PUBLICATIONS

"Reinforcing Steel," Chapter 8, State of Maine Bridge Development Guide, available at http://www.maine.gov/mdot/bdg/docs/bpdg/chpt8.pdf (last visited Apr. 17, 2015), 40 pages.
(Continued)

*Primary Examiner* — Zachary M Davis

(57) ABSTRACT

A coated article is described, including a substrate with a coating composition applied thereon to provide a coated article with a textured surface. In one aspect, the coated article is a steel rebar used to reinforce concrete. The textured surface provides optimal surface roughness and demonstrates superior pullout strength relative to an uncoated standard.

8 Claims, 3 Drawing Sheets

Related U.S. Application Data continuation of application No. PCT/US2016/030432, filed on May 2, 2016.

(60) Provisional application No. 62/155,911, filed on May 1, 2015.

(51) Int. Cl.

| | |
|---|---|
| *B05D 7/14* | (2006.01) |
| *B29B 7/00* | (2006.01) |
| *C09D 5/03* | (2006.01) |
| *C09D 5/08* | (2006.01) |
| *C09D 5/28* | (2006.01) |
| *C09D 7/40* | (2018.01) |
| *C09D 163/00* | (2006.01) |
| *E04C 2/06* | (2006.01) |
| *E04C 5/01* | (2006.01) |
| *E04C 5/06* | (2006.01) |
| *E04C 5/07* | (2006.01) |
| *B05D 3/02* | (2006.01) |

(52) U.S. Cl.
CPC ............ *E04C 5/073* (2013.01); *B05D 3/0218* (2013.01); *B05D 2202/00* (2013.01); *B05D 2401/32* (2013.01); *B05D 2602/00* (2013.01); *C08L 2205/14* (2013.01); *C08L 2207/02* (2013.01)

(56) References Cited

U.S. PATENT DOCUMENTS

| | | |
|---|---|---|
| 2001/0038910 A1 | 11/2001 | MacQueen et al. |
| 2009/0022980 A1 | 1/2009 | Sugimoto et al. |
| 2009/0318614 A1 | 12/2009 | Chevalier |
| 2013/0230696 A1 | 9/2013 | Sobek et al. |
| 2016/0257845 A1 | 9/2016 | Park et al. |

FOREIGN PATENT DOCUMENTS

| | | |
|---|---|---|
| CN | 101353544 | 1/2009 |
| CO | 15228541 | 9/2015 |
| EP | 0482608 | 4/1992 |
| JP | 2001123104 | 5/2001 |
| JP | 2002194297 | 7/2002 |
| JP | 2002233819 | 8/2002 |
| JP | 2005066574 | 3/2005 |
| JP | 2007291356 | 11/2007 |
| JP | 2011147845 | 8/2011 |
| JP | 2014083530 | 5/2014 |
| RU | 2045559 | 10/1995 |
| RU | 2289600 | 12/2006 |
| WO | 91/18951 | 12/1991 |
| WO | 00/58389 | 10/2000 |
| WO | 02/100957 | 12/2002 |
| WO | 2005/002530 | 1/2005 |
| WO | 2005/033434 | 4/2005 |
| WO | 2012/059491 | 5/2012 |
| WO | 2012/110451 | 8/2012 |

OTHER PUBLICATIONS

Australian Patent Application No. 2016257795 filed Sep. 18, 2017; First Examination Report issued Aug. 26, 2019, 5 pages.
Brazilian Patent Application No. 112017023345-2, filed Oct. 30, 2017; Pre-Examination Office Action issued Jan. 9, 2020; 4 pages.
Chengde Yang, Science and Technology Literature Press, Feb. 28, 2015, pp. 126-128.
Chilean Patent Appliation No. 27532017 filed Oct. 31, 2017; First Technical Report issued Jan. 16, 2019, 10 pages.
Chilean Patent Application No. 27532017 filed Oct. 31, 2017; Second Technical Report issued Dec. 30, 2019, 13 pages.
Chinese Patent Application No. 2016800251079 filed Oct. 31, 2017; First Office Action and Search Report issued Jul. 1, 2019, 21 pages. (English language translation included.).
Chinese Patent Application No. 2016800251079 filed Oct. 31, 2017; Second Office Action issued Jan. 21, 2020, 17 pages. (English language translation included.).
Colombian Patent Application No. 20170011180 filed Oct. 30, 2017; First Office Action, date of issuance unknown (possibly Nov. 14, 2017), 3 pages.
Colombian Patent Application No. 20170011180 filed Oct. 30, 2017; Second Office Action and Search Report, May 8, 2019, 17 pages.
Colombian Patent Application No. 20170011180 filed Oct. 30, 2017; Third Office Action and Search Report, Jan. 10, 2020, 19 pages.
European Patent Application No. 16789897.2 filed Nov. 30, 2017; Extended European Search Report, Oct. 22, 2018, 8 pages.
Indian Patent Application No. 201717034108 filed Sep. 26, 2017; First Examination Report issued Feb. 24, 2020, 6 pages.
International Patent Application No. PCT/US2016/030432 filed May 2, 2016; International Preliminary Report on Patentability issued Nov. 7, 2017, 7 pages.
International Patent Application No. PCT/US2016/030432 filed May 2, 2016; International Search Report and Written Opinion issued Aug. 18, 2016, 16 pages.
Japanese Patent Application No. 2017-557063 filed Oct. 31, 2017, Notice of Rejection issued Mar. 11, 2020, 9 pages.
Mueller, et al., "Textured, Epoxy Coated Reinforcement Bar Investigation", Dec. 22, 2015, Illinois Department of Transportation Bureau of Materials & Physical Research, Springfield, IL, 35 pages.
Pandurangan et al., "Effect of fusion bonded epoxy coating and rib geometry on the bond strength of reinforced concrete", Jan. 2013, The Indian Concrete Journal, 87(1):33-43.
Russian Patent Application No. 2017133148 filed Sep. 22, 2017; Search Report issued Sep. 7, 2018, 2 pages.
Singapore Patent Application No. Q-11201708851 filed Oct. 27, 2017; Notice of Allowance and Examination Report issued Sep. 24, 2018, 7 pages.
Yakovlev, Chemistry and Technology of Lacquer and Paint Coatings, 1981, Chemistry Publishing House, Leningrad, p. 252-255.

1A

1B

2A

2B

Salt

Wire-masked

Sand

HIGH-PERFORMANCE TEXTURED COATING

CROSS REFERENCE TO RELATED APPLICATION(S)

This application is a continuation of U.S. patent application Ser. No. 15/789,608, filed 20 Oct. 2017, which is a continuation of International Application No. PCT/US2016/030432, filed on 2 May 2016, which claims priority to U.S. Provisional Application Ser. No. 62/155,911, filed 1 May 2015, each of which is incorporated herein by reference in its entirety.

BACKGROUND OF THE INVENTION

Aggregate materials, such as concrete, for example, are commonly used in various civil and architectural structures and components because these materials are inexpensive and resistant to corrosion and compressive forces. However, many aggregate materials are not known for tensile strength and will fail when subjected to significant tensile load or lateral shaking forces. Therefore, it is common to reinforce aggregate materials by the inclusion or incorporation of rigid structural insert members in the aggregate material.

Reinforced concrete is an aggregate material that includes structural insert members (typically made of steel and commonly called "rebar") and concrete. Reinforced concrete functions most effectively when the steel is adequately bonded to the concrete.

For high-performance reinforced concrete used in corrosive environments, it is conventional to coat the rebar with a coating composition that provides corrosion resistance. However, such coated rebar often suffers from low adhesion strength (i.e. poor bonding to concrete). Where corrosion is not a significant problem, uncoated or black rebar may be used to reinforce concrete. This type of rebar can typically withstand substantial tensile loads, but tends to fail when subjected to significant lateral forces, such as the forces that result from an earthquake, for example.

Attempts to improve the adhesion strength of reinforced aggregate materials like concrete include sand blasting the insert member prior to embedding the structural insert member into the concrete. The blasting process removes surface impurities including rust and other contaminants and may slightly increase adhesion strength. Structural insert members may also be immersed in water for several days as a pretreatment for improving bond strength and corrosion resistance by creating a surface layer to which concrete can attach. However, in the long term, even pretreated structural insert members tend to disbond from reinforced concrete.

An alternate method to address low adhesion strength of reinforced concrete is to increase the number or size of structural insert members for a given amount of concrete. This is typical for corners of buildings and in bridge decks, for example. However, increasing the number of structural insert members leads to concrete congestion, where concrete is either poorly compacted or does not penetrate at all. This leads to poor concrete design, poor concrete placement, and a significant increase in the cost of reinforced concrete without resolving the problem of low adhesion strength.

Accordingly, there is a need for structural insert members that can withstand significant tensile forces or lateral forces during seismic activity and can be used in an optimal amount to avoid concrete congestion. Coated structural insert members, coating compositions, and methods of making the same are disclosed herein.

SUMMARY

Figure 1:
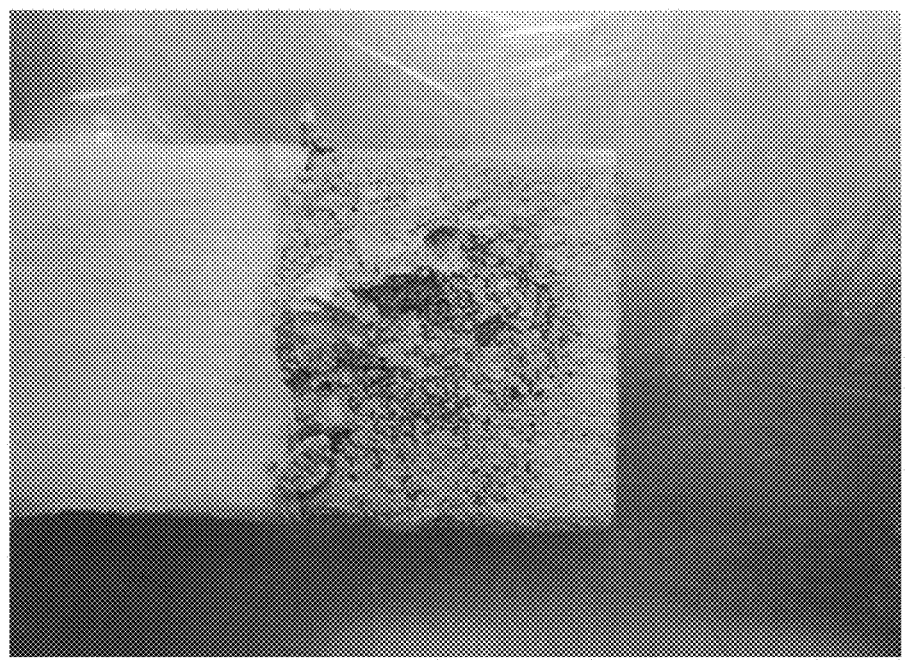
FIG. 1 is a photographic comparison of a metal test bar with a textured coating applied thereon and pulled out of concrete, and a test bar with a smooth surface pulled out of concrete.
Figure 1:
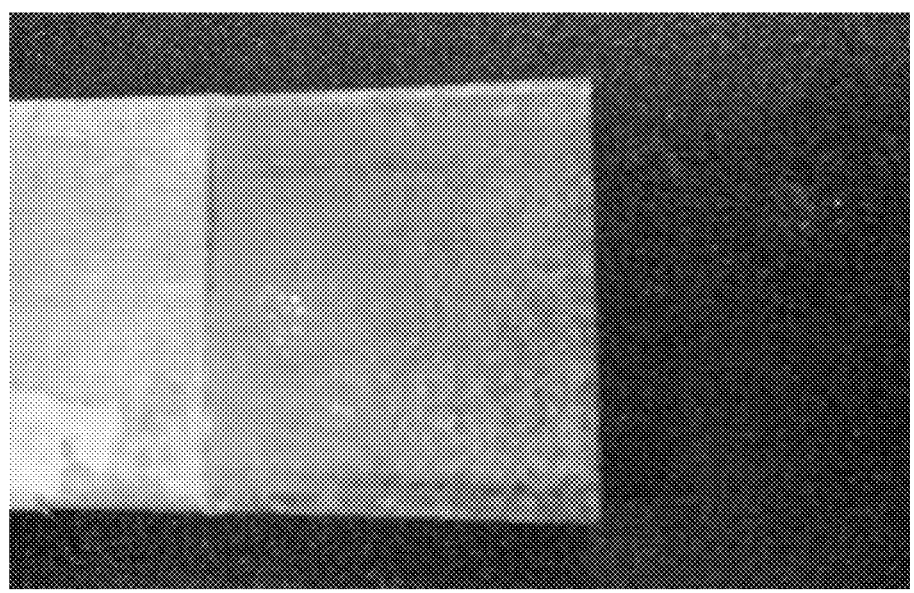

In one embodiment, the present description provides a coated article including a structural insert member and a textured coating applied thereon, where the coated article has surface roughness (Sz) of at least about 150 µm.

In one embodiment, the present description provides a coated article including a structural insert member and at least a powder coating composition applied thereon. The powder coating includes a binder resin component and an agglomerate including a texturizing additive and at least one functionalized filler. The coated article has a textured surface.

In another embodiment, the present description provides a coated structural insert member with a powder coating composition applied thereon. The composition includes about 40 to 70 percent by weight of an epoxy-functional binder, about 0.5 to 5 percent by weight of a texturizing additive and about 0.5 to 20 percent by weight of at least one functionalized filler. The textured coating, when applied to a test bar, as described herein, demonstrates an increase in pullout strength of at least about 10% relative to an uncoated test bar.

In an embodiment, a method of coating an article is described herein. The method includes steps of providing a structural insert member as a substrate and heating the substrate to a temperature of about 200° C. to 300° C. The method further includes steps of applying a first powder coating composition to the heated insert member, and then applying a textured coating over the first coating composition. The textured coating is a powder coating composition including a binder resin component, a texturizing additive and at least one functionalized filler. The method further includes a step of curing the applied powder coating composition.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

Selected Definitions

Unless otherwise specified, the following terms as used herein have the meanings as provided below.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present description features a coated article therein, such as a structural insert member, for example. The term "structural insert member" as used herein refers to a first material used to reinforce a second material in which the first material is incorporated, inserted or embedded. The structural insert member may have various shapes or configurations, including, without limitation, rebar, dowel, mesh, plate, and the like. The structural insert member may be made of various different materials including, without limitation, metal (e.g., steel), glass, polymeric materials, ceramic, and mixtures or combinations thereof. The second material is typically and preferably an aggregate material such as concrete, asphalt, soil, and the like.

In some embodiments, the structural insert member described herein is preferably a metal article, more preferably a steel article. In an aspect, the steel article is reinforcing steel. As used herein, the term "reinforcing steel" refers to steel embedded, inserted, or included in an aggregate material or other material to provide tensile strength. For example, concrete is frequently used in building materials because it is inexpensive, resistant to corrosion and strong in compression. However, concrete is unable to resist strong tensile forces and must be reinforced to resist such tensile forces. The steel reinforcing members or bars used to reinforce concrete are commonly called rebar. For optimal tensile strength of the composite, it is beneficial that the steel rebar and the concrete be adequately bonded together. Rebar is typically shaped or configured to maximize the adhesion between the rebar surface and the concrete. For example, a standard rebar in the industry is an uncoated steel rebar with a ribbed or "twisted rope" helical design that helps the rebar mechanically resist pulling out from concrete when a tensile load is applied.

In an embodiment, the present description provides a coated structural insert member. The structural insert member includes a substrate with a coating composition applied thereon, such that the coated member preferably has a surface that demonstrates superior adhesion strength relative to a smooth structural insert member. Without limiting to theory, it is believed that, in certain embodiments, the coated member as described herein has a surface that improves the micromechanical interaction between the steel rebar and the concrete in a way that increases adhesion strength. This gives the reinforced concrete increased tensile strength. In certain embodiments, the coated member may have a surface that improves the chemical adhesion between the steel rebar and the concrete in a way that increases adhesion strength. Preferably, the surface of the coated member demonstrates optimal micromechanical and chemical adhesion to the concrete.

In an embodiment, a coated structural insert member has a textured or texturized surface. As used herein, the term "textured" or "texturized" refers to a coating characterized by a minimal degree of surface roughness. The surface roughness of the coating is determined by profiling the surface using an optical microscope, and is expressed as Sz, a parameter representing the distance (in microns; μm) between the highest point of the surface and the lowest point of the surface. A smooth coating or a substrate with a smooth surface would have an Sz value close to zero, such as, for example, less than 30 μm, less than 20 μm, or less than 10 μm.

Without limiting to theory, it is believed that a textured surface is beneficial because it may alter the micromechanical interaction between the coated structural insert member and an aggregate material in which the member is placed in a way that significantly improves adhesion of the coated member and the aggregate material. For example, in the context of steel rebar used to reinforce concrete, the interface between the rebar and the concrete may be affected by the surface condition of the rebar. A rebar with a smooth surface may provide a smooth interface such that the steel and the concrete are held together only by weak attractive forces at the interface, and the rebar could easily pull out or disbond from the concrete. However, a rebar with a textured or rough surface may provide strong micromechanical interlocking between the steel and the concrete, such that the rebar would not pull out easily from the concrete. Therefore, the use of a textured rebar would be expected to significantly improve the adhesion between the rebar and the concrete and thereby provide increased tensile strength.

Accordingly, in an embodiment, the coated article described herein is a structural insert member with a texturized or textured surface having a surface roughness (Sz) of at least about 150 μm, preferably at least about 200 μm, more preferably at least about 300 μm. In an aspect, the surface roughness of the textured coating described herein is preferably at least two times, more preferably at least three times, even more preferably at least four times greater than the surface roughness of a smooth or non-textured coating.

A textured coating as described herein may be obtained in a variety of different ways. For example, a textured surface may be obtained by controlling the powder composition's surface tension or by using additives that are incompatible or insoluble in the powder composition. Accordingly, the powder composition described herein preferably includes texturing or texturizing additives, which are agents that produce low flow or are insoluble, or otherwise incompatible in the binder component of the powder composition. Examples of suitable texturizing additives include, without limitation, polymers such as synthetic fluoropolymers (e.g., PTFE, PVDF, and the like), polyvinyl halides (e.g., PVC), polyolefin materials (e.g., polyethylene or polypropylene wax), polyaryl sulfides (e.g., PPS), acrylic elastomers, aliphatic or aromatic polyamides (e.g., nylon), polyaryl ether ketones (e.g., PEEK), silicone, other high-melting engineering plastics, and the like. Additives may also be liquid compositions added directly the coating composition or liquids adsorbed on a solid carrier. In a preferred aspect, the texturizing additive is PTFE, PVDF, PPS, ultra-high molecular weight polyethylene (UHMWPE), perfluoroalkoxyalkane (PFA); tetrafluoroethylene perfluoropropylene (FEP), polyether ether ketone (PEEK), high density polyethylene (HDPE), polyvinyl chloride (PVC), polyvinylidene fluoride (PVDF), para-aramid fibers (KEVLAR), and mixtures or combinations thereof. PTFE is particularly preferred.

When a texturizing additive is used, the degree of texture of the coated article may be influenced by the particle size (D50) of the texturing additive. In an aspect, to produce a textured coated article with the desired surface roughness, the texturing additive has particle size from about 1 to 300 µm, preferably 10 to 100 µm, more preferably 25 to 75 µm, even more preferably 20 to 50 µm, as determined prior to inclusion or incorporation in a coating composition.

In an embodiment, the at least one texturing additive is present in an amount of about 0.1 to 10 wt %, more preferably 0.5 to 5 wt %, even more preferably 1 to 3 wt %, based on the total weight of the coating composition.

The surface roughness of the textured coating may be increased by the inclusion of at least one additional additive. In an aspect, the coating composition described herein includes at least one additive to modify the rheology (flow and leveling) of the coating composition. The additive is a filler, and suitable fillers (e.g., thixotropes) include, for example, silica powders, bentone clay, glass fibers, china clay, talc, mica, wollastonite, and the like. In a preferred aspect, the filler is a functionalized filler, preferably a silane-functional or silanized wollastonite material.

In an embodiment, the at least one functionalized filler is present in an amount of about 0.5 to 20 wt %, preferably 1 to 15 wt %, more preferably 2 to 10 wt %, based on the total weight of the coating composition.

In an embodiment, the composition described herein may include only a texturing additive or only a functionalized filler, as both additives may each function to independently increase the degree of texture or surface roughness of the structural insert member and thereby provide increased adhesion to concrete. In a preferred aspect, however, the composition described herein preferably includes both at least one texturing additive and at least one functionalized filler such that the two may behave in a complementary manner to increase adhesion between the steel rebar and concrete to a degree greater than a composition containing only a filler or only a texturing additive.

Without limiting to theory, it is believed that the texturing additive, preferably PTFE, combines with the functionalized filler, preferably silanized wollastonite, to produce an agglomerate particle. This agglomerate includes particles of wollastonite and PTFE, and may further include particles of the binder resin component and other components of the composition In certain embodiments, the agglomerate has a total particle size sufficient to produce a surface roughness (Sz) of preferably at least about 150 µm. The agglomerate particle may have average particle size of preferably more than 100 µm, more preferably more than 150 µm and even more preferably more than 200 µm.

In an embodiment, the composition described herein may include a texturing additive, a functionalized filler, or both, to increase the degree of texture or surface roughness of the structural insert member and thereby provide increased adhesion to concrete. In an aspect, to provide the desired degree of enhanced adhesion, particles of the texturing additive and filler, or particles of the agglomerate formed by the texturing additive and filler, preferably are at least partially embedded in the coating such that the particles are part of the coating and not merely present on the surface of the coating as a superficial textured layer. Without limiting to theory, it is believed that a superficial textured layer would not provide coating integrity, and moreover, the particles of the superficial textured layer would be lost during testing, manufacture or use. In an alternate embodiment, the particles of texturing additive, filler, and/or an agglomerate formed therefrom, may be at least partially encapsulated by the coating composition, thereby becoming an integral part of the coating rather than being merely physically disposed on the surface.

A textured surface may be obtained by forming a discontinuous coating on the surface of a structural insert member. For example, in an embodiment, a discontinuous coating may be formed by including a material such as a salt, for example, in the coating composition that will disappear or dissolve during application or curing (or in a post application process), leaving behind a film with voids or holes. In another embodiment, a discontinuous coating may be formed by embedding coarse material or grit (e.g., sand, silica, and the like) into the coating, e.g., after the coating has been applied to the surface of a structural insert member. This produces a layer of coarse material on the surface of an otherwise smooth coating. In yet another embodiment, a discontinuous film may be formed by masking parts of the structural insert member before a coating is applied, applying the coating to the masked member and then removing the mask from the coated member This produces a film that does not completely cover the surface of the insert member.

Various methods may be used to produce a textured coating. Regardless of the method used to produce the textured coating, however, the textured coating described herein preferably demonstrates optimal surface roughness as well as optimal mechanical properties including optimal cohesion and optimal adhesion of the coating to the surface of the structural insert member. For example, a coating may demonstrate significant surface roughness but if the coating delaminates from the insert member or fails cohesively, it is not an ideal textured coating as described herein. Accordingly, in an embodiment, the textured coating described herein has optimal surface roughness and optimal mechanical properties.

The textured coating described herein demonstrates optimal micromechanical and chemical adhesion to the concrete. Accordingly, in an embodiment, the textured coating includes an adhesion promoter. An effective adhesion promoter has affinity for both the substrate and any coating applied over the substrate, or any material in which the substrate is embedded or inserted. With respect to reinforced concrete, an effective adhesion promoter will increase adhesion of the structural insert member to the concrete, but also promote adhesion of the textured coating to the structural insert member.

Suitable adhesion promoters include, for example, silanes, silicones, catalytic metals, and the like. Of these, silane adhesion promoters or coupling agents are preferred. Without limiting to theory, it is believed that silane adhesion promoters function via the formation of silanol on hydrolysation. The silanol groups may react with the substrate as well as with any other material that contacts the substrate. Examples of suitable silane adhesion promoters include, without limitation, alkoxysilanes (e.g., methoxysilane, ethoxysilane, etc.), halosilanes (e.g., chlorosilane), hindered silanes (e.g., diisopropyl-modified silane, aminopropyl-modified silane, etc.), unsaturated silanes (e.g., vinyl silanes), and combinations and mixtures thereof.

In an embodiment, the at least one adhesion promoter is present in an amount of about 0.5 to 10 wt %, preferably 1 to 5 wt %, more preferably 2 to 3 wt %, based on the total weight of the composition.

In an embodiment, the present description provides a metal article, such as a structural insert member, for example, with a coating composition applied thereon. The coating may be any type of organic, inorganic or hybrid coating, and any type of liquid coating composition, powder coating composition, or combinations thereof. The coating composition generally includes a film forming resin or binder resin component and optionally, a curing or cross-linking agent for the resin. The binder resin component may be selected from any resin or combination of resins that provides the desired film properties. Suitable examples of polymeric binders including thermoset and/or thermoplastic materials, and can be made with epoxy, polyester, polyurethane, polyamide, acrylic, polyvinylchloride, nylon, fluoropolymer, silicone, other resins, or combinations thereof. Epoxies, polyesters and acrylics are particularly preferred.

In a preferred aspect, the polymeric binder includes at least one epoxy resin composition or polyepoxide. Suitable polyepoxides preferably include at least two 1,2-epoxide groups per molecule. In an aspect, the epoxy equivalent weight is preferably from about 100 to about 4000, more preferably from about 500 to 1000, based on the total solids content of the polyepoxide. The polyepoxides may be aliphatic, alicyclic, aromatic or heterocyclic. In an aspect, the polyepoxides may include substituents such as, for example, halogen, hydroxyl group, ether groups, and the like.

Suitable epoxy resin compositions or polyepoxides used in the composition and method described herein include without limitation, epoxy ethers formed by reaction of an epihalohydrin, such as epichlorohydrin, for example, with a polyphenol, typically and preferably in the presence of an alkali. Suitable polyphenols include, for example, catechol, hydroquinone, resorcinol, bis(4-hydroxyphenyl)-2,2-propane (Bisphenol A), bis(4-hydroxyphenyl)-1,1-isobutane, bis (4-hydroxyphenyl)-1,1-ethane, bis (2-hydroxyphenyl)-methane, 4,4-dihydroxybenzophenone, 1, 5-hydroxynaphthalene, and the like. Bisphenol A and the diglycidyl ether of Bisphenol A are preferred.

Suitable epoxy resin compositions or polyepoxides may also include polyglicydyl ethers of polyhydric alcohols. These compounds may be derived from polyhydric alcohols such as, for example, ethylene glycol, propylene glycol, butylene glycol, 1,6-hexylene glycol, neopentyl glycol, diethylene glycol, glycerol, trimethylol propane, pentaerythritol, and the like. Other suitable epoxies or polyepoxides include polyglycidyl esters of polycarboxylic acids formed by reaction of epihalohydrin or other epoxy compositions with aliphatic or aromatic polycarboxylic acid such as, for example, succinic acid, adipic acid, azelaic acid, sebacic acid, maleic acid, fumaric acid, phthalic acid, tetrahydrophthalic acid, hexahydrophthalic acid, trimellitic acid, and the like. In an aspect, dimerized unsaturated fatty acids and polymeric polycarboxylic acids can also be reacted to produce polyglycidyl esters of polycarboxylic acids.

In an embodiment, the epoxy resin compositions or polyepoxides described herein are derived by oxidation of an ethylenically unsaturated alicyclic compound. Ethylenically unsaturated alicylic compounds may be epoxidized by reaction with oxygen, perbenzoic acid, acid-aldehyde monoperacetate, peracetic acid, and the like. Polyepoxides produced by such reaction are known to those of skill in the art and include, without limitation, epoxy alicyclic ethers and esters.

In an embodiment, the epoxy resin compositions or polyepoxides described herein include epoxy novolac resins, obtained by reaction of epihalohydrin with the condensation product of aldehyde and monohydric or polyhydric phenols. Examples include, without limitation, the reaction product of epichlorohydrin with condensation product of formaldehyde and various phenols, such as for example, phenol, cresol, xylenol, butylmethyl phenol, phenyl phenol, biphenol, naphthol, bisphenol A, bisphenol F, and the like.

In an embodiment, the coating composition applied on the structural insert member is a powder coating composition. Thermoset materials are generally preferred for use as polymeric binders in powder coating applications. The powder composition described herein is a curable composition that includes at least one curing agent. In an embodiment, the curing agent described herein helps achieve a solid, flexible, epoxy-functional powder composition. Suitable curing agents include, for example, epoxide-functional compounds (e.g., triglycidyl-isocyanurate), hydroxyalkyl amides (e.g., beta-hydroxyalkyl amide, commercially known as PRIMID), blocked isocyanates or uretdiones, amines (e.g., dicyandiamide), dihydrazides (e.g., adipic acid dihydrazide (ADH), isophthalic dihydrazide (IDH), sebacic dihydrazide (SDH), and the like), phenolic-functional resins, carboxyl-functional curatives, and the like. The curing reaction may be induced thermally, or by exposure to radiation (e.g., UV, UV-vis, visible light, IR, near-IR, and e-beam).

In an aspect, the curing agent is selected to be compatible with the epoxy resin composition and operate to cure the powder composition at the temperature used to cure and apply the powder composition. Therefore, for the powder composition described herein, the curing agent is preferably selected to have a melting or softening point within the range of application temperature described herein, i.e. preferably about 150° C. to 300° C., more preferably about 220° C. to 260° C.

Accordingly, in a preferred embodiment, the powder composition described herein is a fusion-bonded epoxy (FBE) composition. Preferred compositions include an epoxy resin prepared from a homogenous mixture of polyglycidyl ether of a polyhydric phenol, along with a dihydrazide or dicyandiamide curing agent. In an aspect, the fusion-bonded epoxy composition is present in an amount of about 20 to 90 wt %, preferably about 30 to 80 wt %, more preferably about 40 to 70 wt %, and most preferably about 50 to 60 wt %, based on the total weight of the powder composition.

In some embodiments, the textured coating described herein is a liquid coating, preferably a liquid epoxy coating. These coatings are preferably thermosetting and have high solids content. In an embodiment, the curing agent described herein helps achieve a solid, flexible, epoxy-functional powder composition. The liquid composition described herein is a curable composition that may include at least one curing agent. Suitable curing agents include, for example, aliphatic amines, cycloaliphatic amines, polyamines, amides, polyamides, and mixtures and combinations thereof. The curing reaction may be induced thermally, or by exposure to radiation (e.g., UV, UV-vis, visible light, IR, near-IR, and e-beam). In a preferred aspect, the epoxy coating is a two-part system and curing occurs at ambient temperatures.

In an aspect, the liquid epoxy composition is present in an amount of about 20 to 90 wt %, preferably about 30 to 80 wt %, more preferably about 40 to 70 wt %, and most preferably about 50 to 60 wt %, based on the total weight of the powder composition.

The composition described herein may include other additives. These other additives can improve the application of the coating, the melting and/or curing of that coating, or the performance or appearance of the final coating. Examples of optional additives which may be useful in the composition include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, and edge coverage additives.

In an embodiment, where the composition described herein is a powder coating, the polymeric binder is dry mixed together with any additives including any texturizing additives, functionalized fillers, and the like, and then is typically melt blended by passing through an extruder. The resulting extrudate is solidified by cooling, and then ground or pulverized to form a powder. Alternatively, the additives described herein may be combined with a pigment or other composition to be added to the powder composition after extrusion. The additive particles may be present on the surface of the powder composition, or in the alternative, the additive particles may be blended with the powder composition. In a preferred aspect, the texturizing additive and functionalized filler are added to the polymeric binder prior to extrusion.

Other methods may also be used. For example, one alternative method uses a binder that is soluble in liquid carbon dioxide. In that method, the dry ingredients are mixed into the liquid carbon dioxide and then sprayed to form the powder particles. If desired, powders may be classified or sieved to achieve a desired particle size and/or distribution of particle sizes. In yet another alternative method, the powder composition may be dissolved in a solvent commonly used in coating compositions and then applied as a liquid coating.

Optionally, other additives may be used in the present invention. As discussed above, additives may be added prior to extrusion and be part of the extruded powder composition, or may be added after extrusion. Suitable additives for addition after extrusion include materials that would not perform well if they were added prior to extrusion; materials that would cause additional wear on the extrusion equipment, or other additives.

Additionally, optional additives include materials which are feasible to add during the extrusion process, but may also be added later. The additives may be added alone or in combination with other additives to provide a desired effect on the powder finish or the powder composition. These other additives can improve the application of the powder, the melting and/or curing, or the final performance or appearance. Examples of optional additives which may be useful include: pigments, cure catalysts, antioxidants, color stabilizers, slip and mar additives, UV absorbers, hindered amine light stabilizers, photoinitiators, conductivity additives, tribocharging additives, anti-corrosion additives, degassing additives, flow control agents, and the like.

In an aspect, the textured coating described herein when applied to the substrate (i.e. rebar) improves the adhesion between the substrate and the medium (i.e. concrete) in which the substrate is placed. One possible method for assessing this degree of adhesion is by measuring the pullout strength of the rebar. As used herein, the term "pullout strength" refers to the amount of force required to pull a rebar out of concrete and correlates to the adhesion strength between a structural insert member and the aggregate material in which the insert member is incorporated. With reference to reinforced concrete, the greater the pullout strength, the stronger the bond between the rebar and the concrete. For steel rebar, pullout strength is measured according to the procedures provided in ASTM A944-10 (Standard Test Method for Comparing Bond Strength of Steel Reinforcing Bars to Concrete Using Beam-End Specimens). Pullout strength may also be determined using a modified version of ASTM A944-10 designed to provide a laboratory-scale assessment of adhesion strength. Steel test samples are potted into small containers of ready mix concrete. After potting and curing the concrete, the steel test samples are subjected to a tensile force and pulled out of the concrete. The peak stress measured in this test correlates to adhesion strength of the steel and concrete.

Conventionally, reinforced concrete used in construction uses two types of rebar. In situations where concrete is likely to experience corrosion (for example, bridges, roadways, and the like), it is conventional to coat steel rebar to provide a smooth corrosion-protective surface and thereby increase the lifetime of the reinforced concrete. However, concrete reinforced with smooth coated rebar demonstrates lower tensile strength and cannot withstand strong tensile forces, such as those experienced in high-rise buildings, for example. For these applications, where high tensile strength is required, or where corrosion protection is not necessary (for example, in high-rise buildings, and the like), standard uncoated rebar, also known as black bar, is used. Black bar typically has a ribbed or twisted rope (i.e. helical) configuration to allow for increased interaction between the rebar and concrete relative to a smooth steel rebar.

Surprisingly, the rebar with the textured coating described herein demonstrates superior pullout strength relative to a smooth coated bar, as the textured surface increases the adhesion between the rebar and the concrete. Also surprisingly, the rebar with the textured coating demonstrates superior pullout strength relative to the uncoated standard rebar or black bar. In an aspect, the rebar with the textured coating demonstrates pullout strength of at least 5% greater, preferably 10% greater, more preferably 15%, most preferably 20% and optimally at least 30% greater than standard black bar, or a smooth bar.

The textured coating described herein can be applied as a single layer, i.e. directly to the surface of a substrate, such as an uncoated steel rebar. Alternatively, the textured coating may be applied as a second powder coating over a first coating already applied to the steel rebar. In one embodiment, the first coating is a coating composition, preferably an epoxy coating, more preferably a smooth, corrosion-resistant epoxy coating. The second coating is a powder coating composition, preferably a fusion-bonded epoxy coating, more preferably a textured coating that provides surface roughness (Sz) of at least 150 μm. In an embodiment, when first and second coating compositions are applied, the substrate is heated to allow at least partial cure or gelling of the first coating before the second is applied. In an alternative embodiment, the second coating composition may be applied over a substantially uncured or ungelled first coating.

The single-layer textured coating provides increased tensile strength relative to uncoated standard rebar, and is particularly useful in construction and other uses where corrosion protection is less critical than improved tensile strength. For example, in areas of the world with significant seismic activity, reinforced concrete must be able to withstand significant forces, and the single-layer textured coating provides superior resistance to such forces relative to conventional uncoated rebar. The single-layer textured coating may also be used with prefabricated rebar, i.e. rebar that is bent into a desired shape at the manufacturing stage and before any coating is applied. The single-layer textured coating may also act as a corrosion-resistant coating.

Although the single-layer textured coating may provide corrosion protection, it is believed, without limitation to theory, that a rough or textured surface is discontinuous and may include microscopic pores and/or crevices that may not be fully covered by a coating composition. If water penetrates into these pores and/or crevices, it may cause corrosion in areas where reinforced concrete is exposed to a corrosive environment.

Accordingly, where corrosion protection and increased tensile strength are required, a textured dual-layer coating may be used, where a first coating is applied to the steel substrate to provide corrosion resistance, followed by the application of a second coating that gives the substrate a textured surface. Such a dual-layered coating provides increased tensile strength because of the textured surface, and corrosion-resistance because the first coating has film continuity sufficient to resist corrosion. Moreover, the dual-layer textured coating may have greater flexibility, and is therefore useful in both pre-fabricated rebar and post-fabricated rebar, i.e. coated rebar that is bent into a desired shape after the manufacturing stage and after coating has been applied.

In an embodiment, the textured coating described herein affects the embedment length of rebar. As used herein, the term "embedment length" means the minimum length of steel that has to be encased in concrete to provide the required strength. The textured coating described herein improves the strength of reinforced concrete by improving the interaction between rebar and concrete, and as a result, the length of rebar that must be encased in concrete to provide the same strength may be reduced. It may also be possible to achieve the same tensile strength with textured rebar that has a smaller diameter than standard uncoated bar.

In an embodiment, the textured coating described herein affects the splice length of rebar. Conventionally, when steel rebar is used to reinforce concrete, two pieces of rebar are overlapped in order to create a continuous line of rebar in the concrete. The splice length of the lap (i.e. the distance of overlap) depends on a number of variables, including the size and spacing of the rebar. The textured coating described herein improves the interaction between rebar and concrete, and also the interaction between two pieces of rebar. As a result, the splice length of rebar required to provide the same strength may be reduced.

Accordingly, in an embodiment, the present description provides a coated article, i.e. a steel rebar with a textured surface, where the textured coating provides enhanced pullout strength relative to uncoated standard of at least 5%, preferably 10%, more preferably 15%, even more preferably 20% and optimally at least 30% greater in length for the same diameter of rebar. In another embodiment, the present description provides a coated article that demonstrates equivalent pullout strength as an uncoated standard at least 5%, preferably 10%, more preferably 15%, even more preferably 20% and optimally at least 30% greater in diameter for the same length of rebar.

Alternatively, the number of reinforcing bars (or the diameter of the bars) required for a given amount of reinforced concrete may be reduced as a result of the increased tensile strength provided. As rebar costs are substantially higher than concrete costs, reducing the total amount of rebar needed represents a significant cost reduction for reinforced concrete. This would also help avoid concrete congestion and the accompanying high costs in construction.

The present description provides methods for making a coated article. The method includes steps for providing a substrate and applying a coating composition on the substrate. The coating composition may be a liquid composition, a powder composition, a powder composition dissolved in a solvent, and the like. Liquid compositions may be applied to substrate by various means known in the art, including spray, roll coating, dip coating, brush coating and the like. In an aspect, where a dual-layer liquid coating is applied, the second coating is applied over the first coating after the first coating has been dried or cured. In another aspect, a dual-layer coating may be a hybrid coating including both powder coating and liquid coating compositions. For example, a first liquid coating may be applied to the structural insert member, with a textured powder coating applied over a dried or cured film of the liquid coating. Alternatively, a first powder coating may be applied to the structural insert member, with a textured liquid coating applied over the gelled or cured film of the powder coating.

In an aspect, the coated article is a textured rebar with a single-layer powder coating applied thereon. The method includes steps of providing a substrate and applying a powder coating composition thereon. The substrate is first heated to a temperature of about 150° C. to 300° C., preferably about 220° C. to 260° C. and a textured coating is formed on the substrate by applying the powder coating composition to the substrate. In an aspect, the substrate may be cleaned or treated to remove surface impurities, by sandblasting, for example prior to heating and applying the coating composition.

The present description also provides methods for making a coated article with a dual-layer coating. The method includes the steps providing a substrate, i.e. a steel rebar. This is followed by a step of heating the substrate to a temperature of about 150° C. to 300° C., preferably about 220° C. to 260° C. A first coating is formed on the substrate by applying a first composition to the substrate to provide corrosion resistance. The first coating may be a powder coating, a liquid coating, or a hybrid coating. A textured coating is formed over the first coating by applying a powder coating composition over the first composition. In an aspect, the textured coating is applied over the first coating immediately, i.e. when the first coating is substantially uncured. In an alternative aspect, the textured coating is applied over the first coating after the first coating is cured. In an aspect, the substrate may first be cleaned or treated to remove surface impurities, by sandblasting, for example prior to heating and applying the first coating composition.

The powder composition described herein may be applied to a substrate, such as a steel rebar for example, by various means including the use of fluid beds and spray applicators. Most commonly, an electrostatic spraying process is used, wherein the particles are electrostatically charged and sprayed onto an article that has been grounded so that the powder particles are attracted to and cling to the article. The coating is then cured, and such curing may occur via continued heating, subsequent heating, or residual heat in the substrate. For example, the coating may be applied to a heated substrate such that curing occurs in a continuous manner.

The compositions and methods described herein may be used with a wide variety of substrates. Typically and preferably, the coating compositions described herein are powder coating compositions used to coat metal substrates including without limitation, unprimed metal, clean- or sand-blasted metal, and pretreated metal, including plated substrates and ecoat-treated metal substrates. Typical pretreatments for metal substrates include, for example, treatment with iron phosphate, zinc phosphate, and the like. Metal substrates can be cleaned and pretreated using a variety of standard processes known in the industry. Examples include, without limitation, iron phosphating, zinc phosphating, nanoceramic treatments, various ambient temperature pretreatments, zirconium containing pretreatments, acid pickling, or any other method known in the art to yield a clean, contaminant-free surface on a substrate. A preferred metal substrate is steel rebar that has been sand-blasted clean prior to application of the coating.

The coating may be applied at any film thickness as required by the particular substrate and its use. Typically, the final film coating for a single-layer coating will have a thickness of preferably about 125 to 700 microns, more preferably 200 to 575 microns, even more preferably 250 to 425 microns. Where the coating is a dual-layer coating, the first coating will have a thickness of 100 to 500 microns, more preferably 150 to 400 micron, even more preferably 175 to 300 microns, with the second coating having a thickness of 25 to 200 microns, more preferably 50 to 175 microns, even more preferably 75 to 125 microns.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available.

Test Methods

Unless indicated otherwise, the following test methods were utilized in the Examples that follow.

Rebar Pullout Strength Test

Pullout strength testing is used to assess the degree of interaction between steel rebar and concrete. The test is performed according to ASTM A944-10 (Standard Test Method for Comparing Bond Strength of Steel Reinforcing Bars to Concrete Using Beam-End Specimens). Briefly, a test bar is cast in a block of reinforced concrete and a tensile load is applied to the test bar. The distance of bar displacement is monitored, along with initial and maximum load readings.

Bar/Wire Pullout Strength Test

Pullout strength testing may also be used as a lab-scale or bench-scale assessment of the interaction between a metal test bar or wire and concrete. For such testing, several batches of wet concrete are prepared from ready-mix concrete (QUIKRETE) and 250 mL of concrete is poured into individual plastic containers. Coated metal test bars (0.64 cm×2.54 cm×20.32 cm) are then potted into each cup of concrete to a depth of about 1.9 cm. After potting, the concrete is allowed to cure for three days and a tensile load of 5 kN is applied to each test bar while supporting the upper surface of the concrete using an Instron 3345 instrument and test bars are pulled from concrete at a rate of 1 mm/min. The peak stress observed provides a measure of pullout strength for each coated test bar.

Surface Roughness Measurement

The degree of texture is determined by measuring the surface roughness of coated metal test bars using a Keyence Optical microscope. The microscope optical profiler generates an image of the surface rendered as peaks and troughs. Surface roughness is reported as Sz, a parameter representing the distance between the highest point of the surface and the lowest point of the surface.

Example 1. Pullout Strength Testing

Powder compositions were prepared as shown in Table 1 and coated on to test specimens at the indicated film thickness. Pullout strength tests were performed according to ASTM A944-10. Results are shown in Table 1.

TABLE 1

| | Pullout Strength | | | | |
|---|---|---|---|---|---|
| Test Specimen | Pullout Nm | % Pullout relative to standard | Film thickness mm | Pullout per mm (KN) | Particle size of powder (μm) |
| Uncoated rebar (control) | 1677 | — | — | — | — |
| Rebar with corrosion-resistant coating (coated bar) | 718.6 | 42.9 | 0.28 | 2566 | 62-70 |
| Single layer (textured coating) | 1381 | 82.4 | 0.261 | 5291 | 30-40 |
| Single layer (textured coating) | 1006 | 60.0 | 0.310 | 3245 | 60-70 |
| Single layer (textured coating) | 1831 | 109.2 | 0.381 | 4806 | 90-100 |
| Dual layer (corrosion-resistant first coating + textured second coating) | 2026 | 120.8 | 0.3302 | 6136 | 90-100 |

Example 2. Effect of Surface Roughness on Pullout Strength

Figure 2:
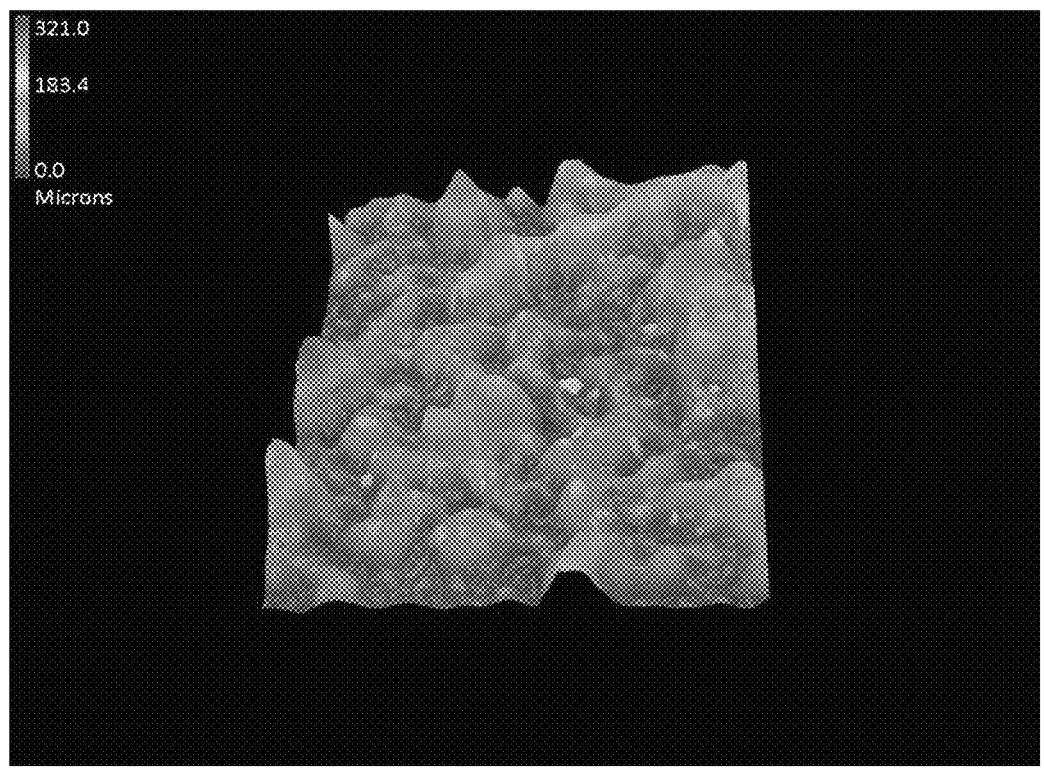
FIG. 2 is a microscope image comparison of a metal test bar with a textured coating applied thereon and pulled out of concrete, and a test bar with a smooth surface.
Figure 2:
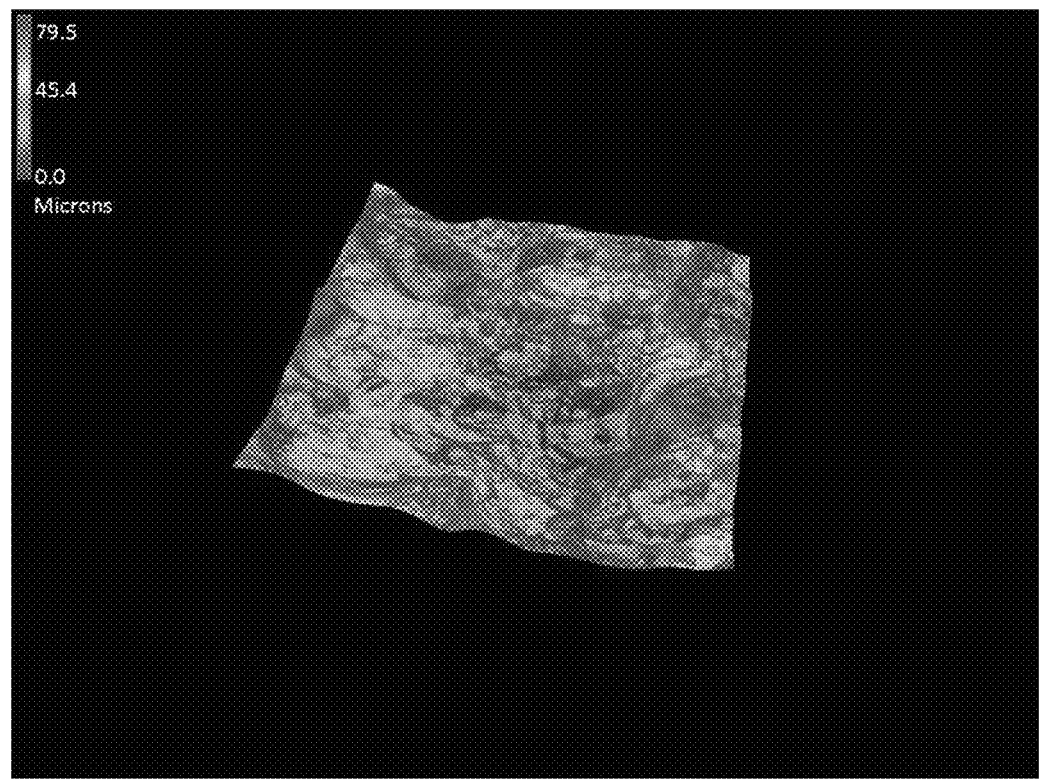

To determine the effect of surface roughness on pullout strength, metal test bars were coated with formulations #1 to #4 as shown in Table 2. For each test bar, the surface roughness was measured using a light microscope. The surface was imaged as shown in FIG. 2A, which depicts microscope images of a test bar surface with a textured coating applied thereon. FIG. 2B depicts a microscopic image from an uncoated surface.

For pullout strength testing, each test bar was potted in concrete for pullout testing. A tensile load was applied and each test bar was pulled out of the concrete at a fixed rate. The peak stress for each bar was measured, and results are reported in Table 2. A positive correlation is observed between surface roughness and peak stress.

TABLE 2

Surface Roughness and Pullout Strength

| Sample No. | Description | Surface roughness (Sz; μm) | Peak stress (KPa) |
|---|---|---|---|
| 1 | Bare metal; blasted (control) | 79.5 | 1584 |
| 2 | Corrosion-resistant coating (smooth) | 166.9 | 1485 |
| 3 | Textured coating (single-layer; bar) | 337.3 | 2340 |
| 4 | Textured coating (dual-layer; textured coating applied over smooth coating) | 339.2 | 1924 |

Example 3. Effect of Surface Roughness on Adhesion to Concrete

To demonstrate the effect of surface roughness on the adhesion of a coated metal bar to concrete, powder coating formulations #1 to #4 (as shown in Table 2) were applied to metal test bars and the bars where then potted in concrete. After potting and curing of the concrete, a tensile load was applied and the test bars were pulled out of the concrete at a fixed speed. FIG. 1A depicts a test bar coated with a textured coating and FIG. 1B depicts a test bar with a smooth surface. Concrete remains adhered to the textured coating on the test bar, whereas the test bar with the smooth surface pulls out cleanly from the concrete.

Example 4. Effect of Texturizing Additive on Pullout Strength

To assess the effect of various texturizing additives on surface roughness and corresponding pullout strength, powder coating formulations #5 to #8 were applied to metal test bars using the texturing additives shown in Table 3. Surface roughness values were measured for each test bar, and the bars were then potted in concrete. After potting and curing of the concrete, a tensile load was applied and the test bars were pulled out of the concrete at a fixed speed. Peak stress was measured for each test bar and results were as shown in Table 3. The formulation containing PTFE particles showed increased surface roughness and pullout strength relative to formulations made with other texturizing additives.

TABLE 3

Texturizing Additive and Surface Roughness

| Sample No. | Description of Texturing agent | Surface roughness (Sz; μm) | Peak stress (KPa) |
|---|---|---|---|
| — | None (control) | 26.7 | 1361 |
| 5 | PTFE (inventive) | 337.3 | 2337 |
| 6 | PPS | 161.6 | 1604 |
| 7 | Acrylic | 90.8 | 1374 |
| 8 | Glass particles | 225.7 | 1623 |

Example 5. Effect of Thixotrope on Surface Roughness

To determine the effect of specific thixotropic agents and texturing additives on surface roughness and corresponding pullout strength, powder coating formulations #9 and #10 were applied to metal test bars. Each formulation including the same texturizing additive but different thixotropes as shown in Table 4. Surface roughness values were measured for each test bar using a light microscope. Results are as reported in Table 4. The combination of PTFE and the functionalized filler material showed increased surface roughness.

TABLE 4

Thixotropes and Surface Roughness

| Description of Texturing agent | Surface roughness (Sz; μm) |
|---|---|
| None (control) | 26.7 |
| PTFE + functionalized filler (inventive) | 337.3 |
| PTFE + clay filler (comparative) | 145.9 |

Example 6. Effect of Different Types of Texture on Surface Roughness

Figure 3:
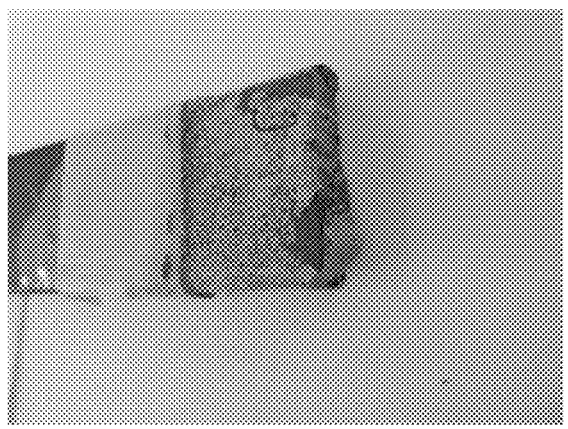
FIG. 3 is a photographic comparison of textured coatings made by different methods.
Figure 3:
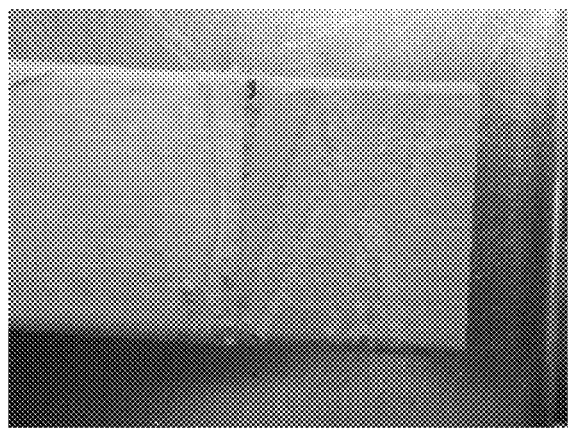
Figure 3:
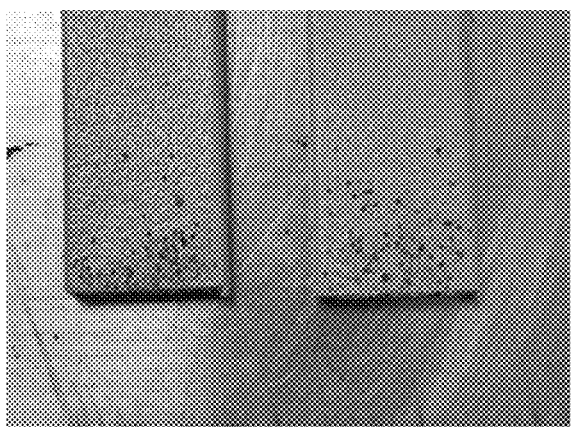

To determine the correlation between surface roughness and texture, metal test bars were coated with a conventional epoxy coating and texture was introduced by various methods as shown in Table 5. FIG. 3 provides a visual depiction of the various types of texture. For comparison, a test bar coated with the inventive textured coating was also used. The surface roughness of each test bar was measured and the samples were then potted in concrete. After potting and curing of the concrete, a tensile load was applied and the test bars were pulled out of the concrete at a fixed speed. Peak stress was measured for each test. Results were as shown in Table 5.

Some texturing methods produce significant surface roughness but no corresponding increase in adhesion relative to the uncoated control. This may be due to the failure of the coating on a cohesive level or because the particles did not adhere properly to the coating, or were not properly encapsulated in the coating. With respect to texture produced by the wire, the roughness was limited to the relatively small area of the mask.

TABLE 5

Texturing Methods

| Sample No. | Description of Texturing Method | Surface roughness (Sz; μm) | Peak stress (KPa) |
|---|---|---|---|
| — | None (control) | 26.7 | 1622 |
| 11 | Textured (texturizing additive) | 337.3 | 2180 |
| 12 | Textured (salt; coating has voids or holes) | 598.0 | 1899 |
| 13 | Textured (sand; large particles adhere to surface after application) | 181.8 | 1919 |
| 14 | Textured (wire; parts of coating are masked) | 499.3 | 1821 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

We claim:

1. A coated article, comprising:
a powder coating composition applied on a structural insert member at a film thickness of 250 to 425 micron, the powder coating composition comprising:
   about 40 to 70% by weight of a binder resin component;
   about 0.1 to 10% by weight of a texturizing additive with median particle size (D50) of about 20 to 300 μm prior to extrusion with the binder resin component of the powder coating composition; and
   about 0.5 to 20% by weight of a functionalized filler, wherein the texturizing additive and functionalized filler combine to form an agglomerate of average particle size of at least 200 μm, and the coated article has surface roughness (Sz) of at least 150 μm, and demonstrates an increase in pullout strength of at least 10% relative to an uncoated article, when tested by ASTM A944-10.

2. The coated article of claim 1, wherein the structural insert member is an article made of material selected from metal, glass, polymeric materials, ceramic, and mixtures or combinations thereof.

3. The coated article of claim 1, wherein the structural insert member is an article selected from rebar, dowel, fiber, mesh, plate, and combinations thereof.

4. The coated article of claim 1, wherein the structural insert member is steel rebar used to reinforce concrete.

5. The coated article of claim 1, wherein the texturizing additive is present in an amount of about 0.5 to 5 wt %, based on the total weight of the coating composition.

6. The coated article of claim 1, wherein the texturizing additive has median particle size (D50) of about 50 to 75 micron prior to extrusion with the binder resin component of the powder coating composition.

7. The coated article of claim 1, wherein the pullout strength of the coated article is at least 20% greater than an uncoated article, when tested by ASTM A944-10.

8. The coated article of claim 1, wherein the pullout strength of the coated article is at least about 30% greater than an uncoated article, when tested by ASTM A944-10.

* * * * *